(12) United States Patent
Babu

(10) Patent No.: US 7,548,965 B2
(45) Date of Patent: Jun. 16, 2009

(54) SYSTEM AND METHOD FOR ORGANIZING NETWORK MANAGEMENT INFORMATION

(75) Inventor: Saranya Babu, Santa Clara, CA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1155 days.

(21) Appl. No.: 10/417,497

(22) Filed: Apr. 17, 2003

(65) Prior Publication Data

US 2004/0210650 A1 Oct. 21, 2004

(51) Int. Cl.
*G06F 15/16* (2006.01)
(52) U.S. Cl. .................. 709/223; 709/224; 709/202
(58) Field of Classification Search .................. 709/202, 709/223
See application file for complete search history.

(56) References Cited

U.S. PATENT DOCUMENTS

| | | | |
|---|---|---|---|
| 5,913,037 A | 6/1999 | Spofford et al. | ........ 395/200.56 |
| 6,539,422 B1 * | 3/2003 | Hunt et al. | ................... 709/217 |
| 6,539,540 B1 * | 3/2003 | Noy et al. | .................... 717/141 |
| 7,099,947 B1 * | 8/2006 | Nadeau et al. | .............. 709/229 |
| 2002/0018455 A1 * | 2/2002 | Yokoyama | ................... 370/338 |
| 2003/0131118 A1 * | 7/2003 | Lee | ............................ 709/230 |
| 2004/0210650 A1 * | 10/2004 | Babu | ......................... 709/223 |
| 2007/0288558 A1 * | 12/2007 | Land et al. | ................... 709/203 |

* cited by examiner

*Primary Examiner*—Ario Etienne
*Assistant Examiner*—Barbara N Burgess
(74) *Attorney, Agent, or Firm*—Merchant & Gould

(57) ABSTRACT

A Simple Network Management Protocol (SNMP) agent includes logic configured to add a first object ID to a first MIB corresponding to a first software entity responsive to a request from the first software entity, and configured to add a second object ID to a second MIB corresponding to a second software entity responsive to a request from the second software entity, and logic configured to delete the first object ID from the first MIB responsive to a request from the first software entity, and configured to delete the second object ID from the second MIB responsive to a request from the second software entity.

3 Claims, 4 Drawing Sheets

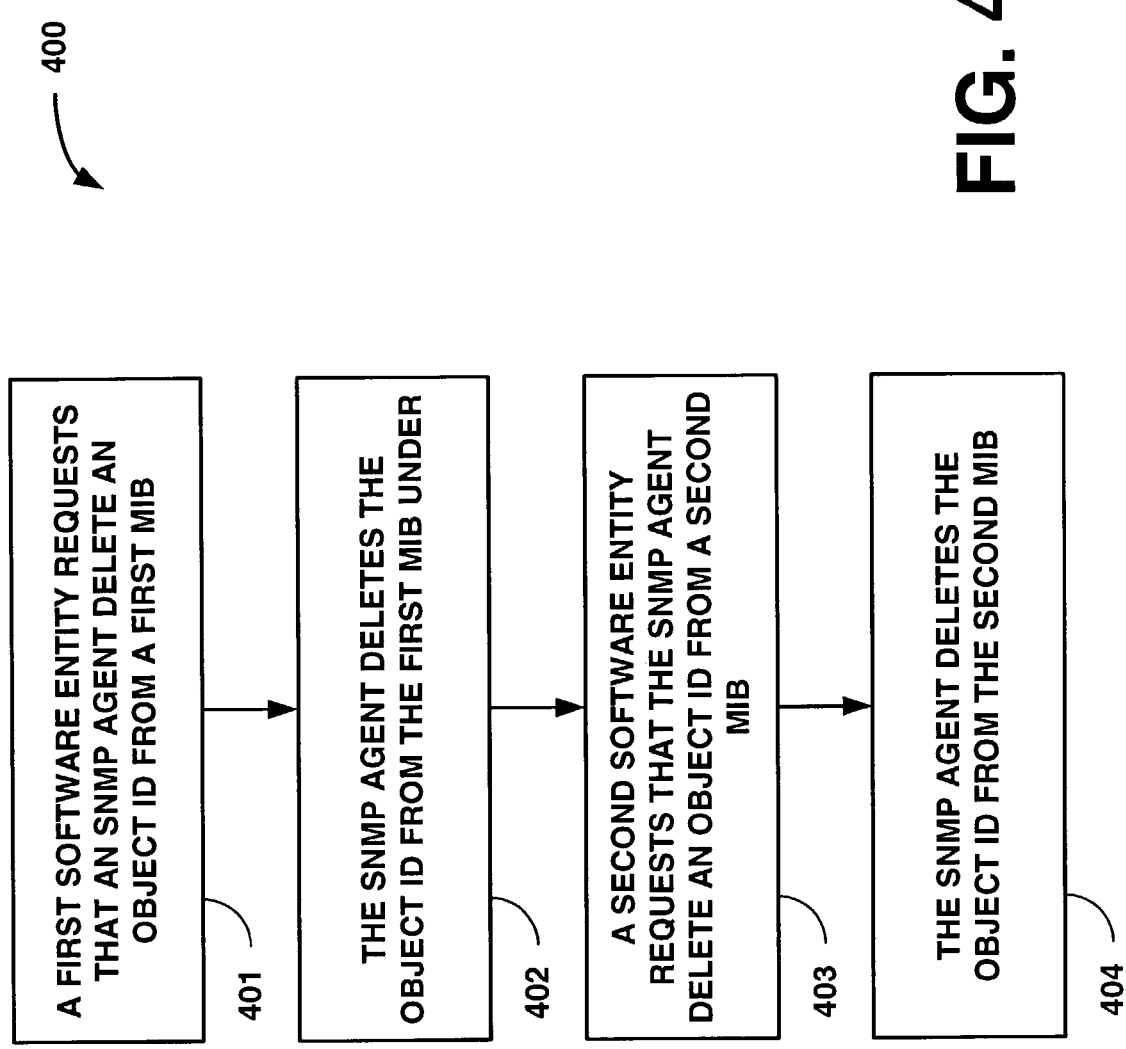

SYSTEM AND METHOD FOR ORGANIZING NETWORK MANAGEMENT INFORMATION

FIELD OF THE INVENTION

The invention relates to the field of Network management. More specifically the invention relates to systems and methods for organizing network management information.

DESCRIPTION OF THE RELATED ART

The Simple Network Management Protocol (SNMP) defines a method by which a remote user can view or change management information for a networked device (a host, gateway, server, etc.). A monitoring or management application on the remote user's system uses the protocol to communicate with an SNMP agent on the networked device to access the management data.

The SNMP agent on each device can provide information about the device's network configuration and operations, such as the device's network interfaces, routing tables, IP packets sent and received, and IP packets lost. This information, which is configured as SNMP objects, is stored in a Management Information Base (MIB) format. An MIB defines the SNMP objects that can be managed and the format for each object. The SNMP protocol, together with the MIB, provide a standard way to view and change network management information on devices from different vendors. An application that implements SNMP can access MIB data on a specified device.

Several standards have been established for MIB Organization. A branch with the object identifier (object ID) 1.3.6.1.4.1, which stands for "iso. org. dod. internet. private. enterprises" has been established for maintaining private enterprise information. An enterprise may obtain an Enterprise ID under this branch and organize enterprise specific information under the Enterprise-ID branch.

In one approach, an application that maintains MIB information registers itself as an extended agent, and then performs as an SNMP agent for requests that are routed to it. Applications that perform as SNMP agents need to incorporate SNMP agent functionality, such as, for example, message processing, protocol data unit (PDU) creation, etc. Such an approach is inefficient and cannot be used by certain lower level software.

Another approach involves organizing an enterprise tree to have a branch for each of the possible vendors in a software stack. Under this approach, every future enhancement of vendor-specific information requires a vendor to obtain the approval from the owner of the enterprise agent, and requires modifying the enterprise agent. Therefore, there exists a need for improved systems and methods for maintaining MIB information.

BRIEF DESCRIPTION OF THE DRAWINGS

Systems and methods for maintaining MIB information are illustrated by way of example and not limited by the implementations illustrated in the following drawings. The components in the drawings are not necessarily to scale, emphasis instead is placed upon clearly illustrating the principles of the present invention. Moreover, in the drawings, like reference numerals designate corresponding parts throughout the several views.

FIG. 4 is a flow chart illustrating a method for deleting object IDs from MIBs, according to an embodiment of the invention.

DETAILED DESCRIPTION OF THE PREFERRED EMBODIMENTS

Figure 1:
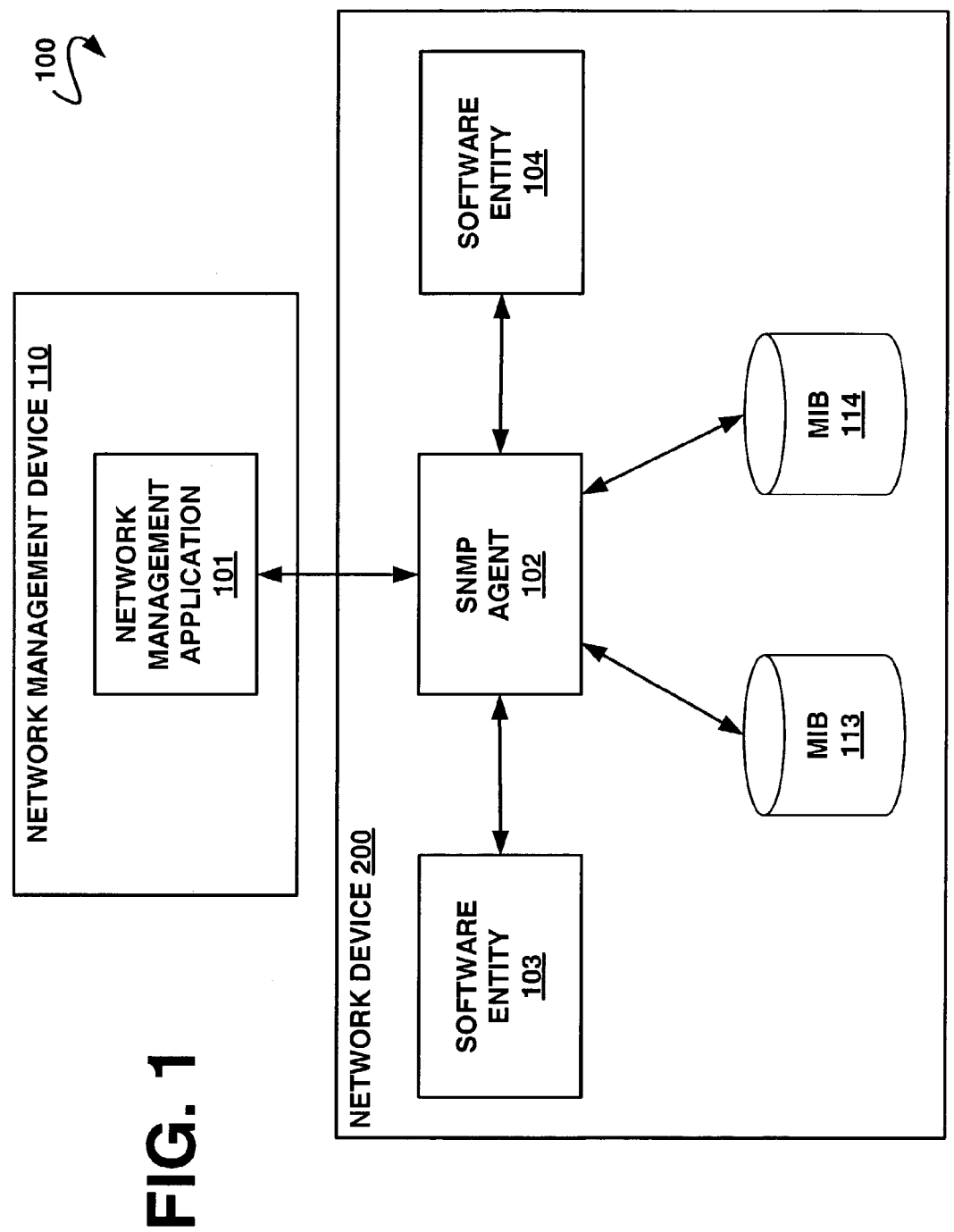
FIG. 1 is a block diagram depicting a network management system according to one embodiment of the invention.
Figure 2:
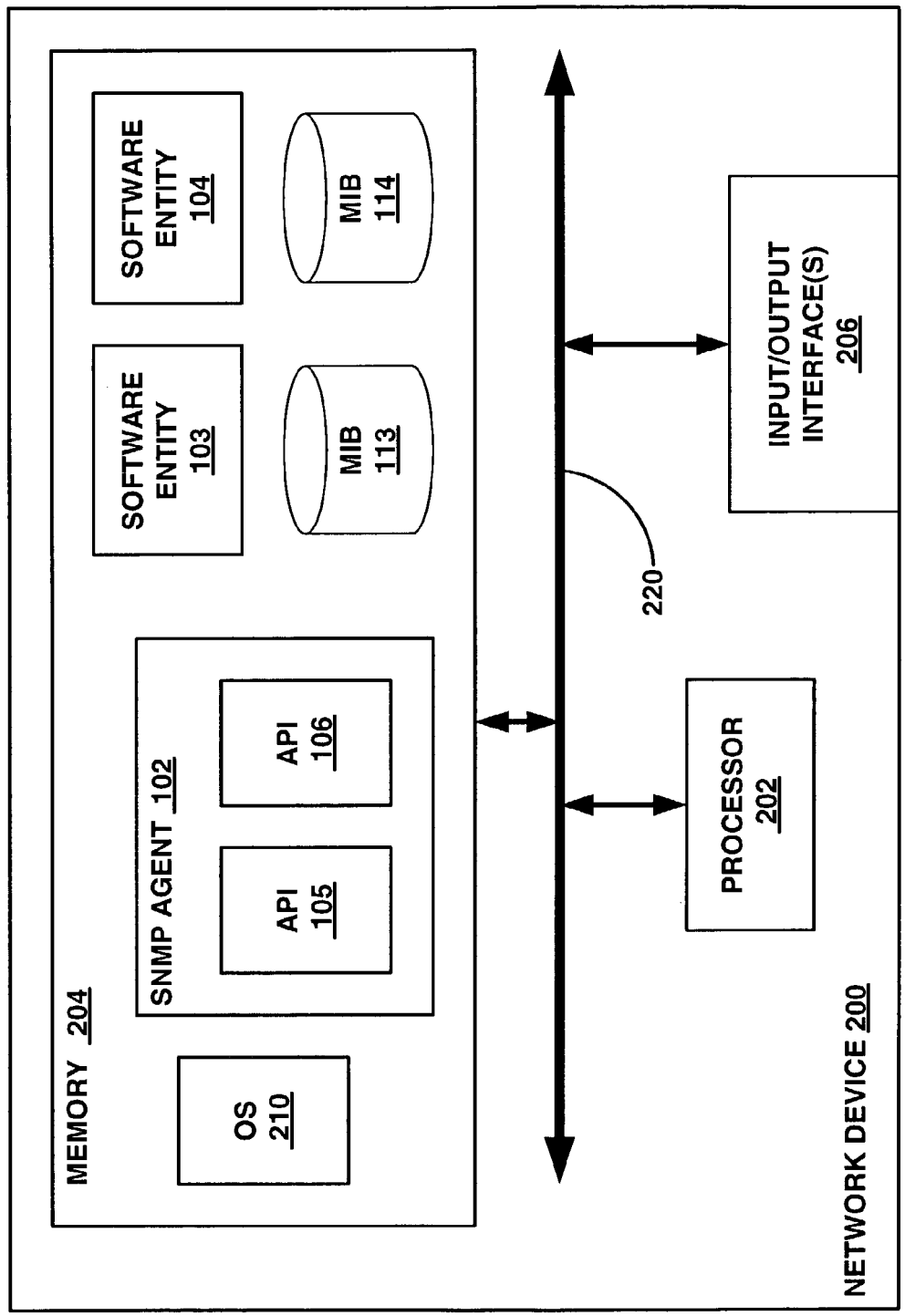
FIG. 2 is a block diagram depicting an embodiment of the network device shown in FIG. 1, according to an embodiment of the invention.

According to one embodiment of the invention, a method is provided for distributed development and maintenance of management information bases (MIBs) in a multi-layer and multi-vendor software stack environment. Below is a detailed description of the accompanying figures, which illustrate preferred embodiments of the present invention: FIGS. 1 and 2 will provide examples of systems that may be used to modify MIBs, and FIGS. 3 and 4 will provide examples of methods for modifying MIBs. Note, however, that the invention may be embodied in many different forms and should not be construed as limited to the embodiments set forth herein. Furthermore, all examples given herein are intended to be non-limiting, and are provided in order to help clarify the description of the invention.

FIG. 1 is a block diagram depicting a network management system 100 according to one embodiment of the invention. The network management system 100 includes a network management device 110 that monitors a plurality of network devices 200 (only one network device 200 is shown). The network management device 110 includes a network management application 101 that communicates with an SNMP agent 102 to obtain information about network-related configuration and operation of the network device 200. This information, which is configured as SNMP objects, is stored in Management Information Bases (MIBs) 113 and 114.

According to one embodiment of the invention, software entities 103 and 104, which were developed by different software vendors, help develop and maintain the MIBs 113 and 114, respectively. The SNMP agent 102 provides an interface through which the software entities 103 and 104 can respectively add object identifiers (object IDs) to the MIBs 113 and 114 under respective enterprise IDs.

As a non-limiting example, among others, the first software entity 103 may be developed by a first company (e.g., Company ABC) having an enterprise ID 1. 3. 6. 1. 4. 1. 9998 (iso. org. dod. internet. private. enterprises. abc), and the second software entity 104 may be developed by a second company (e.g., Company DEF) having an enterprise ID 1. 3. 6. 1. 4. 1. 9999 (iso. org. dod. internet. private. enterprises. def). The object IDs corresponding to the first software entity 103 may then be maintained under 1. 3. 6. 1. 4. 1. 9998 and the object IDs corresponding to the second software entity 104 may be maintained under 1. 3. 6. 1. 4. 1. 9998. An object ID corresponding to the first software entity 103 may be, for example, among others, 1. 3. 6. 1. 4. 1. 9998. 1. 1. 2 (iso. org. dod. internet. private. enterprises. abc. software. software type. version). Similarly, an object ID corresponding to the second software entity 104 may be, for example, among others, 1. 3. 6. 1. 4. 1. 9999. 1. 1. 2 (iso. org. dod. internet. private. enterprises. def. software. software type. version).

FIG. 2 is a block diagram depicting an embodiment of a network device 200 according to an embodiment of the invention. Generally, in terms of hardware architecture, as shown in FIG. 2, the components of the network device 200 include a processor 202, memory 204, and input/output (I/O) interfaces 206. These components (202, 204, and 206) may be communicatively coupled via a local interface 220, which may comprise, for example, among others, one or more buses or other wired or wireless connections. The local interface 220 may have additional elements, which are omitted for simplicity, such as controllers, buffers (caches), drivers, repeaters, and receivers, to enable communications.

The I/O interfaces 206 may be used to communicate with one or more peripheral devices including, for example, among others, a printer, a copier, a keyboard, a mouse, and/or a monitor, etc. The I/O interfaces 206 may include, for example, among others, a serial port, a parallel port, a Small Computer System Interface (SCSI), an IR interface, an RF interface, and/or a universal serial bus (USB) interface.

When the network device 200 is in operation, the processor 202 is configured to execute software stored within the memory 204, to communicate data to and from the memory 204, and to generally control operations of the network device 200 pursuant to the software. The memory 204 may include one or more volatile and/or non-volatile memory devices now known or later developed.

The software applications in memory 204 include an operating system (OS) 210, an SNMP agent 102, and software entities 103 and 104. These software applications may additionally or alternatively be embodied in any computer-readable medium (e.g., magnetic, optical, or semiconductor based, among others). The OS 210 controls the execution of other applications, and provides scheduling, input-output control, file and data management, memory management, and/or communication control, among other functionality.

The SNMP agent 102 provides application programming interfaces (APIs) for adding and deleting object IDs to/from the MIBs 113 and 114. A first API 105 is provided for adding object IDs to the MIBs 113 and 114. This first API 105 performs some basic checks on object ID parameters prior to adding an object ID to MIB 113 or MIB 114 in a manner that keeps the MIBs 113 and 114 lexicographically ordered. Furthermore, the first API 105 does not enable additions under the Enterprise ID of the SNMP agent 102, so as to prevent unintentional or unauthorized additions of object IDs.

Under certain circumstances, the API 105 may return an error message to a software entity 103 or 104 in response a request for adding an object ID to an MIB 113 or 114, respectively. For example, among others, the API 105 may return an error message under one or more of the following circumstances:
 a) Where the API 105 is not initialized at the time an add request is received.
 b) In response to a request for adding an object ID to an MIB having restricted access.
 c) In response to a request for adding an object ID that is longer than a predetermined length.
 d) In response to a request for adding an object ID that is not recognized as being valid.
 e) In response to a request for adding an object ID to an MIB that already contains such object ID.
 f) In response to a request for adding an object ID having an type that is not supported by the API 105.
 g) Where there is insufficient memory capacity to implement an add request.
 h) Where an unknown error occurs.

A second API 106 is provided for deleting object IDs from the MIBs 113 and 114. This second API 106 performs a basic set of checks object ID parameters prior to deleting an object ID from MIB 113 or MIB 114. The second API 106 does not enable deleting object IDs under the Enterprise ID of the SNMP agent 102 so as to prevent unintentional or unauthorized deletions of such object IDs. Furthermore, the MIBs 113 and 114 include a set of static object IDs that are not to be deleted and that are listed in a data structure designated as read-only.

Under certain circumstances, the API 106 may return an error message to a software entity 103 or 104 in response a request for deleting an object ID from an MIB 113 or 114, respectively. For example, among others, the API 106 may return an error message under one or more of the following circumstances:
 a) Where the API 106 is not initialized at the time a delete request is received.
 b) In response to a request for deleting an object ID from an MIB having restricted access.
 c) In response to a request for deleting an object ID that is not recognized as being valid.
 d) In response to a request for deleting an object ID from an MIB that does not contain such object ID.
 e) Where an unknown error occurs.

An object ID may be dynamically added and removed by the SNMP agent 102 at the request of the software entities 103 and 104. The software entities 103 and 104 may develop their own object IDs which may be added at run-time by the first API 105 to the MIBs 113 and 114, respectively. A dynamically added object ID may be used, for example, among others, for debugging or diagnosing a problem with a respective software entity 103 or 104. Before a software entity 103 or 104 quits running, it may cause respective object IDs to be deleted by the second API 106 from a respective MIB 113 or 114. Furthermore, a specialized application (not shown) may be used to clean-up (i.e., delete) unused object IDs.

Figure 3:
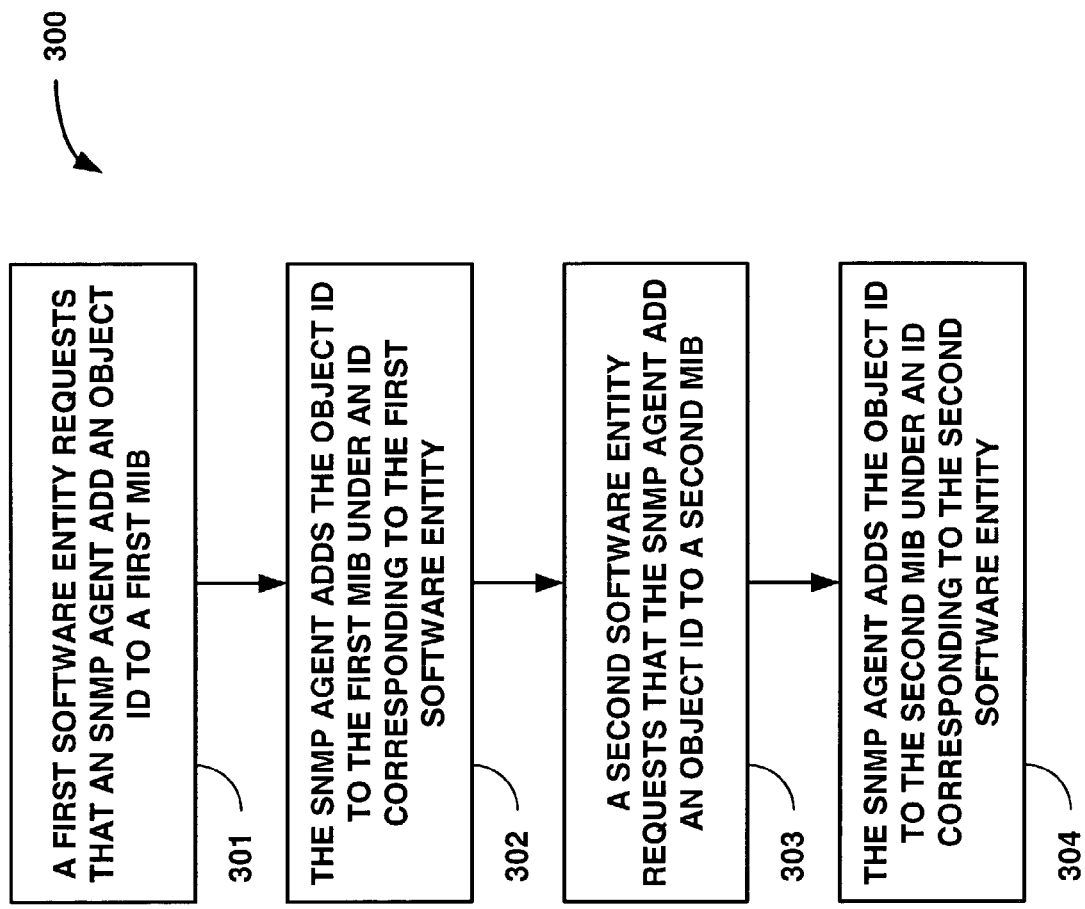
FIG. 3 is a flow chart illustrating a method for adding object identifiers (IDs) to management information bases (MIBs), according to an embodiment of the invention.

FIG. 3 is a flow chart illustrating a method 300 according to one embodiment of the invention. In step 301, a first software entity 103 requests that an SNMP agent 102 add an object ID to a first MIB 113. In response to the request by the first software entity 103, the SNMP agent 102 adds the object ID to the first MIB 113 under an ID corresponding to the first software entity 103, as indicated in step 302. A second software entity 104 then requests that the SNMP agent 102 add an object ID to a second MIB 114, as indicated in step 303. In response to the request by the second software entity 104, the SNMP agent 102 adds the object ID to the second MIB 114 under an ID corresponding to the second software entity 104, as indicated in step 304.

When an object ID is added to an MIB 113 or 114, the corresponding software entity 103 or 104 registers with the OS 210 a callback function for such object ID. The SNMP agent 102 can then use this callback function to return an appropriate value to a user that requests the corresponding object ID. As a non-limiting example, among others, if the object ID 1. 3. 6. 1. 4. 1. 9998. 2. 3. 4. 1. 0 having the name "systemName" is added to the MIB 113, then a callback function get_systemName( . . . ) for returning a value corresponding to the object ID can be registered with the OS 210 by the software entity 103.

FIG. 4 is a flow chart illustrating a method 400 according to one embodiment of the invention. A first software entity 103 requests that an SNMP agent 102 delete an object ID from a first MIB 113, as indicated in step 401. In response to the request by the first software entity 103, the SNMP agent 102 deletes the object ID from the first MIB 113, as indicated in step 402. A second software entity 104 then requests that the SNMP agent 102 delete an object ID from a second MIB 114, as indicated in step 403. In response to the request by the second software entity 104, the SNMP agent 102 deletes the object ID from the second MIB 114, as indicated in step 404.

The blocks shown in FIGS. 3 and 4 represent modules, segments, or portions of code which include one or more executable instructions for implementing specific logical functions or steps in a process. In an alternative embodiment, functions or steps depicted in FIGS. 3 and 4 may be executed out of order from that shown or discussed, including substantially concurrently or in reverse order, depending on the functionality involved, as would be understood by those of ordinary skill in the art.

The functionality provided by the methods illustrated in FIGS. 3 and 4 can be embodied in any computer-readable medium for use by or in connection with a computer-related system (e.g., an embedded system such as a modem) or method. In the context of this document, a computer-readable medium is an electronic, magnetic, optical, semiconductor, or other physical device or means that can contain or store a computer program or data for use by or in connection with a computer-related system or method. Furthermore, the functionality provided by the methods illustrated in FIGS. 3 and 4 can be implemented through hardware (e.g., an application specific integrated circuit (ASIC) and supporting circuitry) or a combination of software and hardware.

It should be emphasized that the above-described embodiments of the present invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method comprising:
    receiving by a Simple Network Management Protocol (SNMP) agent, executing on a network device, a first request from a first software entity, the first request requesting that a first object identifier (ID) be added to a first management information base (MIB) corresponding to the first software entity;
    responsive to receiving the first request, adding by the SNMP agent, executing on said network device, the first object ID to the first MIB;
    receiving by the SNMP agent, executing on said network device, a second request from a second software entity, the second request requesting that a second object ID be added to a second MIB corresponding to the second software entity; and
    responsive to receiving the second request, adding by the SNMP agent, executing on said network device, the second object ID to the second MIB;
    receiving by the Simple Network Management Protocol (SNMP) agent, executing on said network device, a third request from said first software entity, the third request requesting that said first object identifier (ID) be deleted from said first management information base (MIB) corresponding to the first software entity;
    responsive to receiving the third request, deleting by the SNMP agent, executing on said network device, said first object ID from the first MIB;
    receiving by the SNMP agent, executing on said network device, a fourth request from said second software entity, the fourth request requesting that said second object identifier (ID) be deleted from said second management information base (MIB) corresponding to the second software entity;
    responsive to receiving the fourth request, deleting by the SNMP agent, executing on said network device, said second object ID from the second MIB;
    wherein the first software entity, the second software entity, and the SNMP agent are part of a software stack;
    wherein the first software entity was developed by a first vendor and the second software entity was developed by a second vendor;
    wherein the first MIB was developed by said first vendor and the second MIB was developed by said second vendor;
    wherein the SNMP agent was developed by a third vendor;
    wherein the first object ID is added under a first enterprise ID corresponding to said first vendor and the second object ID is added under a second enterprise ID corresponding to said second vendor;
    wherein the first object ID is deleted from under said first enterprise ID corresponding to said first vendor, and the second object ID is deleted from under said second enterprise ID corresponding to said second vendor.

2. A system for maintaining a management information base (MIB) comprising:
    a network device having a memory and processor;
    means for adding by an SNMP agent a first object ID to a first MIB corresponding to a first software entity responsive to a first request from the first software entity;
    means for adding by the SNMP agent a second object ID to a second MIB corresponding to a second software entity responsive to a second request from the second software entity;
    means for deleting by the SNMP agent said first object ID from said first MIB corresponding to said first software entity responsive to a third request from the first software entity;
    means for deleting by the SNMP agent said second object ID from said second MIB corresponding to said second software entity responsive to a fourth request from the second software entity;
    wherein the first software entity is developed by a first vendor, the second software entity is developed by a second vendor, and the first software entity and the second software entity are part of a software stack;
    wherein the first MIB was developed by said first vendor and the second MIB was developed by said second vendor;
    wherein the SNMP agent was developed by a third vendor;
    wherein the first object ID is added under a first enterprise ID corresponding to said first vendor and the second object ID is added under a second enterprise ID corresponding to said second vendor;
    wherein said first object ID is deleted from under said first enterprise ID corresponding to said first vendor, and said second object ID is deleted from under said second enterprise ID corresponding to said second vendor;
    wherein the means for adding and the means for deleting are stored on the memory of the said network device; and
    wherein said means for adding and deleting are executed by the processor.

3. A physical computer readable medium having stored thereon a Simple Network Management Protocol (SNMP) agent comprising:
    executable computer code for adding a first object ID to a first MIB corresponding to a first software entity responsive to a first request from the first software entity, and to add a second object ID to a second MIB corresponding to a second software entity responsive to a second request from the second software entity; and executable computer code for deleting said first object ID from said first MIB responsive to a third request from said first software entity, and to delete said second object ID from said second MIB responsive to a fourth request from the second software entity;

wherein said first software entity, said second software entity, and said SNMP agent are part of a software stack;

wherein said first software entity was developed by a first vendor and said second software entity was developed by a second vendor;

wherein said SNMP agent was developed by a third vendor;

wherein the first MIB was developed by said first vendor and the second MIB was developed by said second vendor;

wherein said first object ID is added under a first enterprise ID corresponding to said first vendor and said second object ID is added under a second enterprise ID corresponding to said second vendor;

wherein said first object ID is deleted from under said first enterprise ID corresponding to said first vendor, and said second object ID is deleted from under said second enterprise ID corresponding to said second vendor.

* * * * *